United States Patent [19]

Wiley, Jr.

[11] 4,087,013
[45] May 2, 1978

[54] SAFETY LOCKING MEANS FOR LIFT ARMS OF STRADDLE CARRIERS

[75] Inventor: James Gordon Wiley, Jr., Yakima, Wash.

[73] Assignee: H.C.M. Company, Inc., Yakima, Wash.

[21] Appl. No.: 710,723

[22] Filed: Aug. 2, 1976

[51] Int. Cl.² .............................................. B60P 3/40
[52] U.S. Cl. .................................... 214/392; 292/201; 254/108
[58] Field of Search ............... 254/108; 214/392, 390, 214/394; 292/201, 144

[56] References Cited

U.S. PATENT DOCUMENTS

| 696,613 | 4/1902 | Waslyng | 254/108 X |
| 722,498 | 3/1903 | Donecker et al. | 254/108 X |
| 1,323,007 | 11/1919 | Brunette | 292/201 X |
| 2,321,591 | 6/1943 | Gardner | 292/201 |
| 3,348,711 | 10/1967 | Gove | 214/392 |

Primary Examiner—Albert J. Makay
Attorney, Agent, or Firm—B. P. Fishburne, Jr.

[57] ABSTRACT

The vertical lift arms of a straddle trailer are equipped with toothed ratchet bars which move therewith as the lift arms elevate a load. Cooperating pivoted pawls on relatively stationary mounts are spring-biased toward locking engagement with the ratchet bars to safely lock the lift arms in elevated load-carrying positions. Pneumatic pawl operators under control of a switch in the tractor cab can withdraw the pawls from locking engagement with the toothed ratchet bars only when the load on the lift arms is relieved by the cable-hydraulic lift arm raising and lowering system of the straddle trailer. Hence, a fail-safe arrangement is provided should either the pneumatic or electrical systems of the trailer fail. The four customary lift arm locking units are synchronized to operate in unison. A load cannot be locked by the system when off-balance. The invention is applicable to either newly manufactured straddle carriers or those already in existence.

2 Claims, 6 Drawing Figures

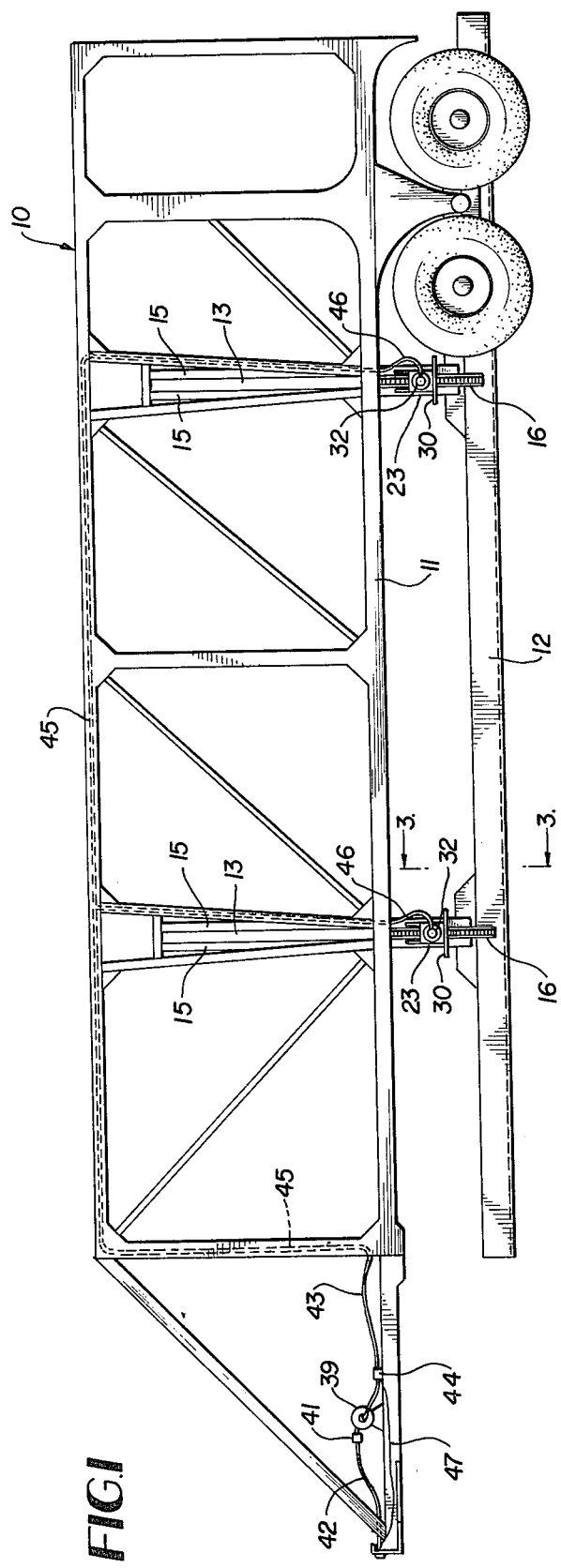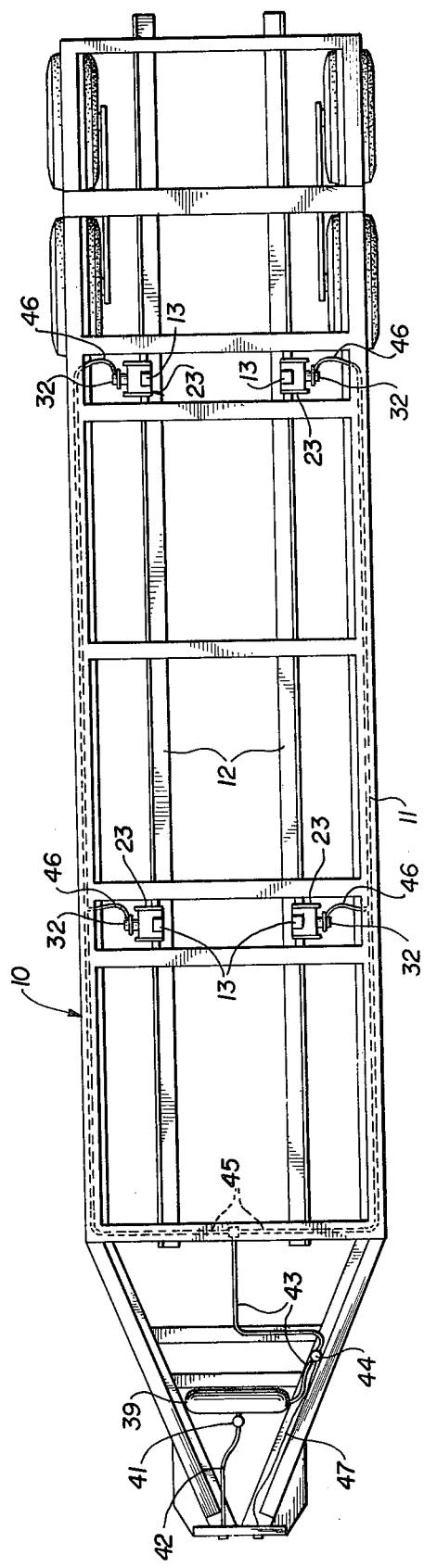

SAFETY LOCKING MEANS FOR LIFT ARMS OF STRADDLE CARRIERS

BACKGROUND OF THE INVENTION

Straddle carriers for trailers substantially of the type shown in U.S. Pat. No. 2,982,430 are commonly employed to carry large loads of produce in bins and for other similar purposes. Such loads of produce including apples, pears, etc. may range from 6 to 27 tons with the produce contained in standard size bins.

The bins are stacked in line and the straddle trailer is backed over them. The driver in the tractor cab controls cable-hydraulic motor means to activate a pair of long opposed lifting arms on the trailer, which arms engage beneath the load and lift it as a unit for transport by the trailer. Such construction and mode of operation is fully described in the above-referenced U.S. patent No. 2,982,430.

Despite wide usage of straddle carriers of this type for a number of years, difficulties continue to be encountered in providing a safe and positive locking system for the load lifting arms to prevent the shifting or dropping of the load in transit. Occasionally, a load will be dropped on the highway creating an obviously serious safety hazard and property loss.

The single objective of this invention is to completely solve the above problem and difficulty of the prior art by the provision of a safe and secure positive locking system for the lift arms of straddle carriers which will render it virtually impossible for the vehicle to drop a load in transit and hence will add greatly to the safety of the carrier.

The invention also provides a fail-safe lift arm locking system in which the multiple pivoted locking pawls cannot be withdrawn from locking engagement with their associated toothed ratchet bars on the lift arms until the load on the lift arms is first relieved by the cable-hydraulic system of the carrier. Therefore, should either the air system or the electric system on the carrier associated with the locking pawls fail, the pawls cannot be disengaged from the cooperating ratchet teeth until the lift arms are elevated slightly to relieve the locking pawls of the load.

Standard automotive air brake actuators (cans) may be employed to operate the pivoted locking pawls. The customary four locking units are synchronized in the invention to operate in perfect unison so that a heavy load cannot be locked in while off-balance. This eliminates excessive stresses on the entire carrier which could otherwise result.

The invention can be installed on most existing carriers in the field in attachment kit form, as well as on newly manufactured straddle carriers.

Other features and advantages of the invention will become apparent to those skilled in the art during the course of the following detailed description.

BRIEF DESCRIPTION OF DRAWING FIGURES

FIG. 1 is a side elevation of the straddle trailer equipped with the present invention.

FIG. 2 is a plan view thereof.

DETAILED DESCRIPTION

Figure 4:
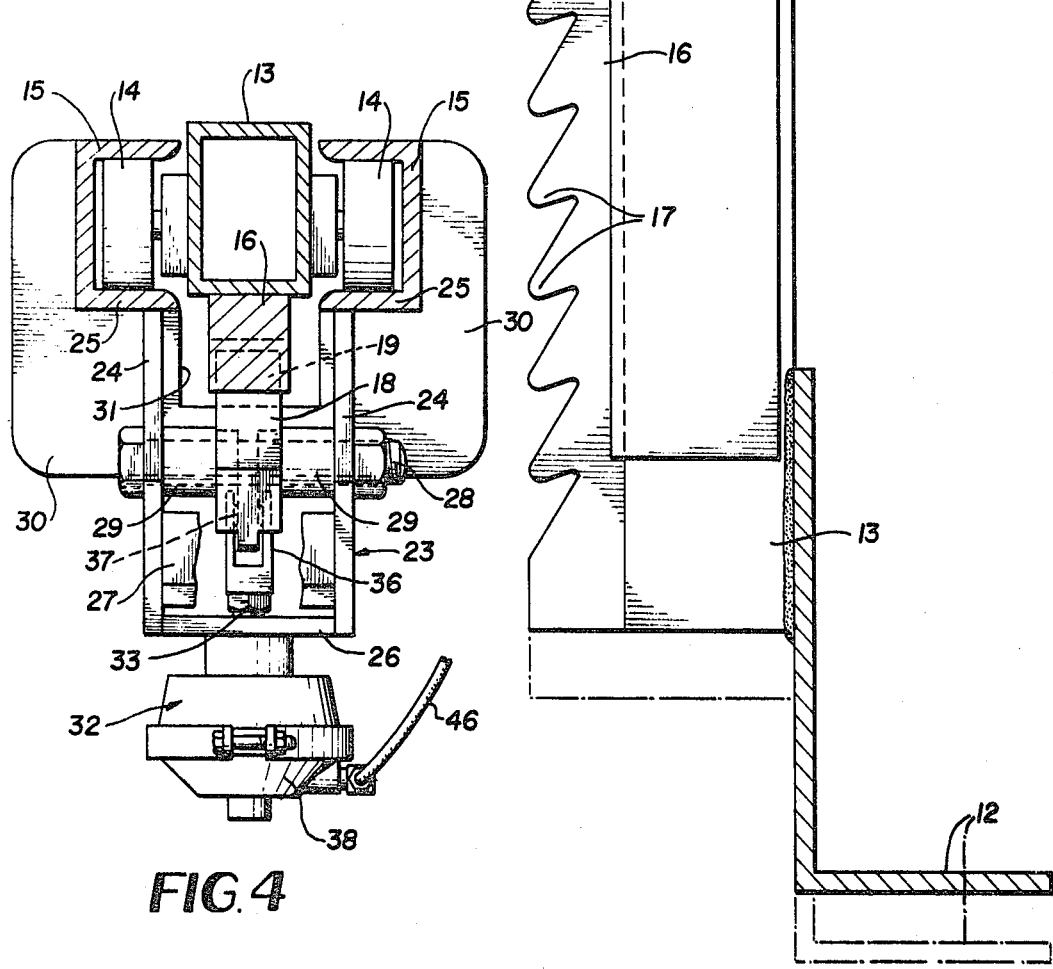
FIG. 4 is an enlarged horizontal section through one lift arm above the associated locking unit taken substantially on line 4—4 of FIG. 3.
Figure 5:
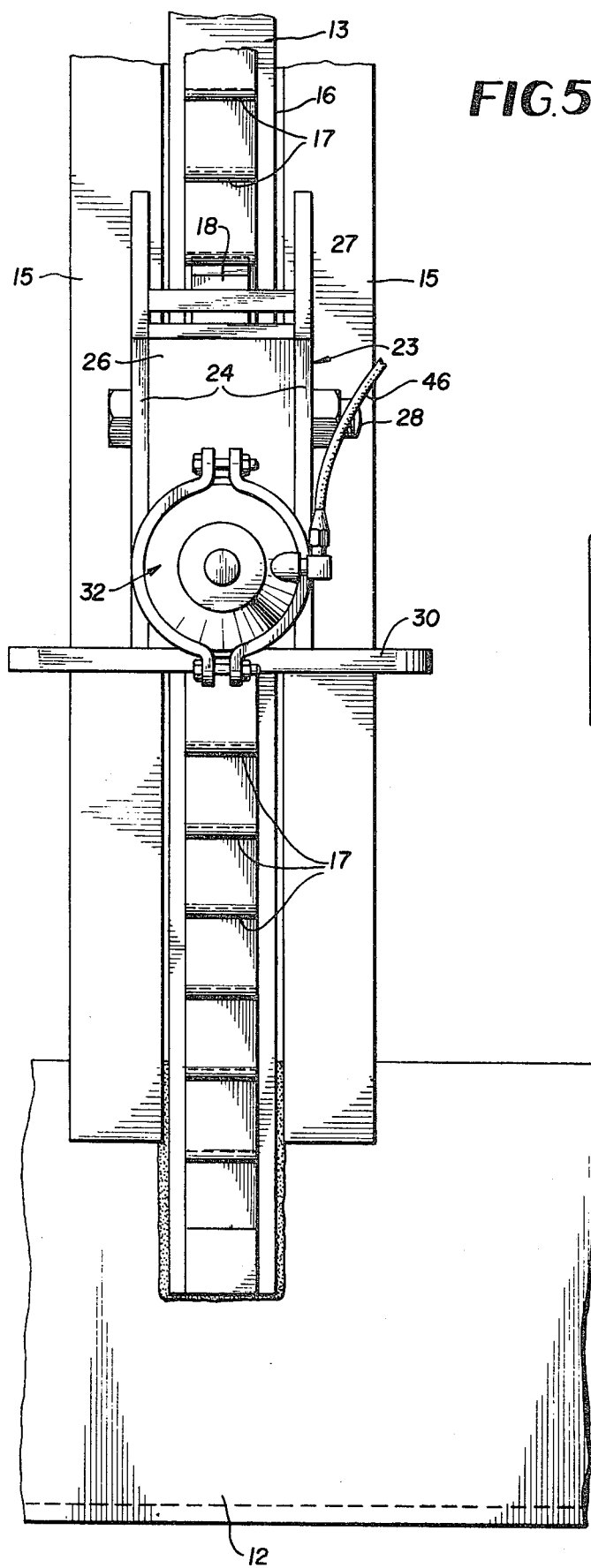
FIG. 5 is a side elevation of one lift arm and associated locking unit on an enlarged scale.
Figure 6:
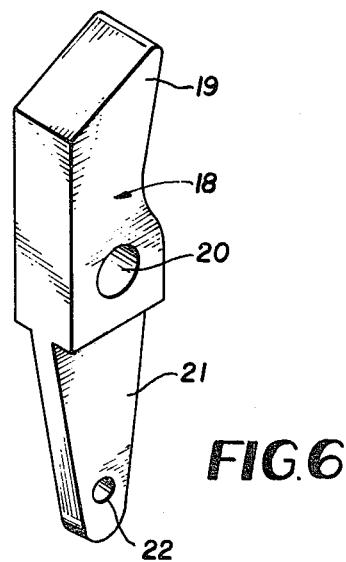
FIG. 6 is a perspective view of a locking pawl.

Referring to the drawings in detail, wherein like numerals designate like parts, and referring first to FIGS. 1 and 2, a straddle carrier 10 or trailer is depicted, and this carrier is substantially of the type shown in the referenced U.S. Pat. No. 2,982,430. It comprises a trailer frame 11 which supports inwardly of the sides thereof a pair of opposed load-engaging and lifting beams 12 which are substantially coextensive lengthwise with the carrier frame 11. The beams 12 are carried by preferably four vertically shiftable lift arms 13 which are preferably box members as shown in FIG. 4. Each lift arm 13 is equipped with side roller means 14 which are guided during movement by opposing fixed channel tracks 15 on the straddle carrier frame 11. The paired tracks 15 lie close to opposite sides of the vertically movable lift arms 13, as shown.

The load lifting beams 12 are raised and lowered in unison with the several lift arms 13 by well-known, cable-hydraulic lifting and lowering means on the carrier as shown in U.S. Pat. No. 2,982,430 and in other similar prior art devices. The conventional cable-hydraulic lifting system for the lift arms 13 is omitted from the drawings and detailed description for simplicity, and because it is fully described in the prior art and per se is not the subject matter of this invention.

The invention proper, as stated, is a safety locking system for the four lift arms 13 which is positive and possesses fail-safe characteristics and includes a locking unit for each lift arm. The four locking units which are identical operate in synchronism to assure that a locked-in load is always properly balanced and securely locked at each of the four lift arms.

Each identical unit of the invention shown in the drawings comprises a vertically elongated toothed ratchet bar 16 fixedly attached to the outer side of each lift arm 13. Each ratchet bar 16 extends upwardly from the lower end of the associated lift arm 13 for a sufficient distance to span the necessary range of movement of the lift arm in raising and lowering the load. The equidistantly spaced locking ratchet teeth 17 of each ratchet bar 16 are downwardly inclined uniformly for positive and secure locking engagement with an associated pivoted locking dog or pawl 18 forming a part of each locking unit.

The pivoted pawl 18 has a single upper end tapered locking tooth 19 to interlock with adjacent teeth 17 of the ratchet bar 16. The pawl 18 has a transverse pivot bore 20 near its longitudinal center and a lower end integral actuator extension 21 provided with a pivot opening 22.

The locking pawl 18 of each locking unit is contained within a sturdy housing 23 having side plates 24 rigidly secured to the outer flanges 25 of channel tracks 15. Each housing 23 also has an outer vertical wall 26 and a partial top wall 27 which forms a stop to limit the outward movement of the pawl tooth 19 away from the teeth 17 of the ratchet bar. A horizontal pivot pin 28, or bolt, on each housing 23 pivotally supports the locking pawl by engagement through the bore 20. Centering spacer rings 29 for the locking pawl 18 are mounted between the housing side walls 24 and the pawl, as best shown in FIG. 4. The housing 23 also includes horizontal mounting flanges 30 which embrace the channel tracks 15 and are welded thereto. A large cut-out 31 is provided in the bottom of the housing to accommodate the movable ratchet bar 16.

Each locking pawl 18 is operated by conventional automotive type air brake actuator (can) 32 which contains an axially shiftable rod 33 and a diaphragm 34 connected with this rod. A spring 35 bearing on one side of the diaphragm 34 (or piston) urges the rod 33 outwardly or away from ratchet bar 16. The actuator rod 33 is pivotally connected to the pawl extension 21 through a clevis 36 and a pin 37 which engages through the opening 22 of the pawl extension. Through this means, the spring 35 biases the pawl tooth 19 into locking engagement with the ratchet teeth 17.

Figure 3:
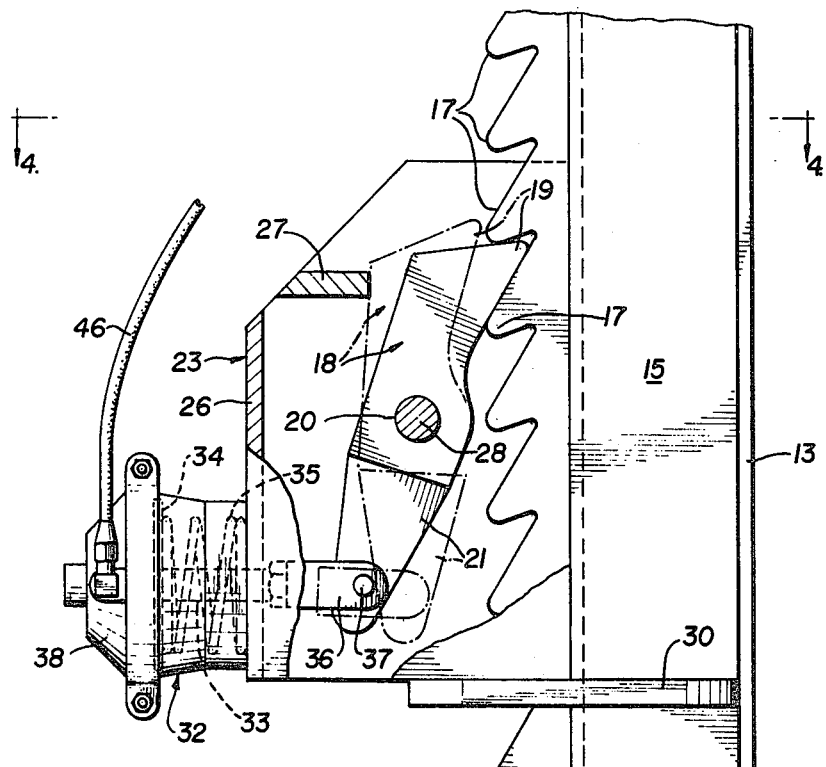
FIG. 3 is an enlarged fragmentary vertical section taken on line 3—3 of FIG. 1.

The actuator 32 has an air chamber 38 on the other side of diaphragm 34 which, when pressurized, pushes the rod 33 toward the ratchet bar 16, overcoming the spring 35 and pivoting the pawl 18 counterclockwise on the pivot element 28 to withdraw the tooth 19 from locking engagement with the ratchet teeth 17. The retracted position of the locking pawl 18 is shown in FIG. 3 with the back of the pawl in contact with fixed stop 27.

As previously noted, the pawl 18 cannot be retracted from the ratchet teeth 17 until the load on the lift arm 13 is relieved by operation of the cable-hydraulic lift system on the straddle carrier. This feature can be seen clearly in FIG. 3 wherein the downwardly inclined teeth 17 capture the pawl tooth 19 and prevent retraction thereof by the actuator unit 32 until the heavy load is first relieved. This constitutes the important fail-safe feature of the invention. Should either the electrical system or the pneumatic system of the carrier fail at any time while a load is elevated and locked by the invention, the load has to be lifted somewhat by the lift arms 13 and the associated cable-hydraulic system, not shown, before the locking pawls 18 can be retracted.

Referring to FIGS. 1 and 2, a compressed air tank 39 is provided on the front of trailer 10 having an associated pressure regulator 41 connected in a line 42 leading to a tractor-mounted compressor, not shown. A compressed air supply line 43 having a solenoid valve 44 connected therein leads from the tank 39 to branch lines 45 which in turn have four additional branch lines 46 connected with the respective air chambers 38 of actuator units 32 outwardly of their diaphragms 34. In this manner, compressed air can be delivered simultaneously through the lines 46 to each pneumatic actuator 32 at the desired times for forcing actuator rods 33 inwardly and turning locking pawls 18 on their pivots in synchronism and in the proper directions to retract the pawls from their locking positions (counterclockwise in FIG. 3).

A control air line 47, FIG. 2, leads from the solenoid valve 44 to a control switch in the tractor cab whereby the operator at proper times may open the solenoid valve 44 and admit compressed air to the chambers 38 of actuators 32 to cause snychronized retraction of the four locking pawls 18 from the ratchet teeth 17. As explained, the pawls can only be retracted in this manner by first relieving the lift arms 13 of the load by operation of the cable-hydraulic lift means on the straddle carrier. The arrangement provides positive, safe and secure locking means for the lift arms so that the possibility of dropping a load during transport is virtually eliminated.

When air pressure to the actuator chambers 38 is relieved conventionally, the springs 35 of the actuators bearing outwardly on the diaphragm means 34 will again urge the pawls 18 into engagement with ratchet teeth 17. Thus, when the lift arms 13 are being elevated to raise a load by operation of the cable-hydraulic means, the pawl teeth 19 will simply skip over the locking teeth 17 of ratchet bars 16 until the proper height is reached, whereupon the pawls will lock against the particular teeth 17 with which they are engaged on the four lift arms 13. The subsequent release or retraction of the pawls 18 by the pneumatic system has already been described.

The system is simple, economical to manufacture and install, extremely durable and requires little maintenance or adjustment. The air actuators 32 may be shelf items, as described, and the related electrical and pneumatic controls are substantially conventional. By having the pawls 18 released from the teeth 17 in synchronism, as well as engaging in synchronism, the heavy load cannot be locked in while off-balance. This avoids over-straining the parts of the invention or the entire carrier.

The advantages of the invention over the prior art should now be apparent to those skilled in the art without further description herein.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a straddle carrier, a wheeled frame, a plurality of opposite side vertically movable lift arms guidably mounted on said wheeled frame and having load engaging and lifting members secured to their lower ends in spaced opposed relationship, and means to support said lift arms securely in selected elevated positions along a full range of movement of the lift arms to thereby relieve a means for raising and lowering the lift arms from the load on the lift arms, said means comprising a toothed ratchet bar secured fixedly to the outer side of each lift arm and extending vertically along each lift arm at least for a distance equaling the full range of movement of the lift arm, a pivoted locking pawl disposed near the outer side of each lift arm and ratchet bar and having a single locking tooth on its upper end and above the pivot of the locking pawl adapted to interlock with teeth of the ratchet bar, relatively stationary supporting means for each pivoted locking pawl, a linear power actuator for each pivoted locking pawl on said supporting means for each locking pawl and connected with the lower end of each locking pawl below the pivot of the locking pawl, and a biasing spring associated with each linear actuator urging said single tooth of each locking pawl toward engagement with the teeth of the opposing toothed ratchet bar, and remote control means coupled with the linear actuator of each pivoted locking pawl and operable to activate all of the linear actuators in unison against the force of the biasing springs to move the teeth of all of the locking pawls out of engagement with the ratchet bar teeth following relieving of the load on said movable lift arms, and pairs of spaced parallel guide tracks for said vertically movable lift arms on said wheeled frame, opposite side guide roller means on each lift arm engaging said tracks, and said supporting means for each pivoted locking pawl fixed to one pair of said tracks, said supporting means including a partial housing for each pivoted locking pawl, and each linear power actuator being secured to each partial housing for the associated locking pawl.

2. In a straddle carrier as defined in claim 1, and each linear power actuator comprising a pneumatic diaphragm actuator having an actuator rod coupled with the lower end of the associated pivoted locking pawl.

* * * * *